United States Patent [19]

McNesby et al.

[11] Patent Number: 4,553,129
[45] Date of Patent: Nov. 12, 1985

[54] DATA TRANSMISSION BY SUBRATE GROUPING

[75] Inventors: John B. McNesby, Mesa, Ariz.; Erik K. Walker, Denver, Colo.

[73] Assignee: GTE Communication Systems Corporation, Phoenix, Ariz.

[21] Appl. No.: 520,669

[22] Filed: Aug. 5, 1983

[51] Int. Cl.[4] ............................................. H03K 13/24
[52] U.S. Cl. ............................... 340/347 DD; 370/102
[58] Field of Search .................. 340/347 DD; 370/84, 370/102

[56] References Cited

PUBLICATIONS

P. Benowitz et al., "Digital Multiplexers", *The Bell System Technical Journal*, May–Jun. 1975, vol. 54, #5, pp. 893–918.
"D3 & D4 Dataport Channel Unit Technical Reference & Compatibility Specification", AT&T Technical Advisory No. 48, Apr. 1981.

*Primary Examiner*—Clifford C. Shaw
*Attorney, Agent, or Firm*—Russell A. Cannon

[57] ABSTRACT

In a data transmission system, apparatus for converting a subrate binary data stream into a binary signal at the line transmission rate comprises means for periodically accepting a date byte from the subrate data stream and; means for expanding the data byte by one additional bit by adding a control bit in the first bit position of the accepting means. The apparatus additionally comprises means for recirculating the expanded data byte through the accepting means a predetermined number of times and means for serially reading out bits of the expanded data byte at the line transmission rate.

18 Claims, 3 Drawing Figures

DATA TRANSMISSION BY SUBRATE GROUPING

BACKGROUND OF THE INVENTION

This invention relates to the transmission of binary data signals and in particular, to the conversion of a low speed binary data signal to a higher speed line transmission rate.

With the standardization of the United States of the T1-type pulse code modulation (PCM) system, a natural data transmission channel became available. The standard channel of such PCM systems accommodates 64 kbps. As a practical matter, the full capacity of the channel could not be employed for the transmission of data as other housekeeping chores would be necessary, and these would take up some of the capacity of the channel. Thus it was standardized on a 56 kbps transmission rate for data that would be applied to the standard PCM T1-type channel.

In order to make use of this available compacity it was necessary to permit subrates of the 56 kpbs capacity for data transmission. These were standardized at 2,400; 4,800; 9,600; and 19,200 bps. Because of the necessity to maintain the line transmission rate, it has become necessary to convert each of the standardized rates into a line transmission signal having a 56 kbps rate that can be accommodated by the telephone network.

SUMMARY OF THE INVENTION

In a data transmission system, a subrate binary data stream is converted into a higher rate binary signal by converting the subrate binary data stream into a series of data bytes, expanding each said data byte by adding a control bit in the most significant bit position, recirculating the expanded data byte through the converting means, and serially writing out the bits of said expanded data bytes at the line transmission rate. The MSB is a binary 1 in the first byte and a binary 0 thereafter for enabling rapid locking onto an input data signal in a switched system. In a 19.2 kbps data system, a pair of bytes are circulated.

DETAILED DESCRIPTION OF THE INVENTION

Figure 1:
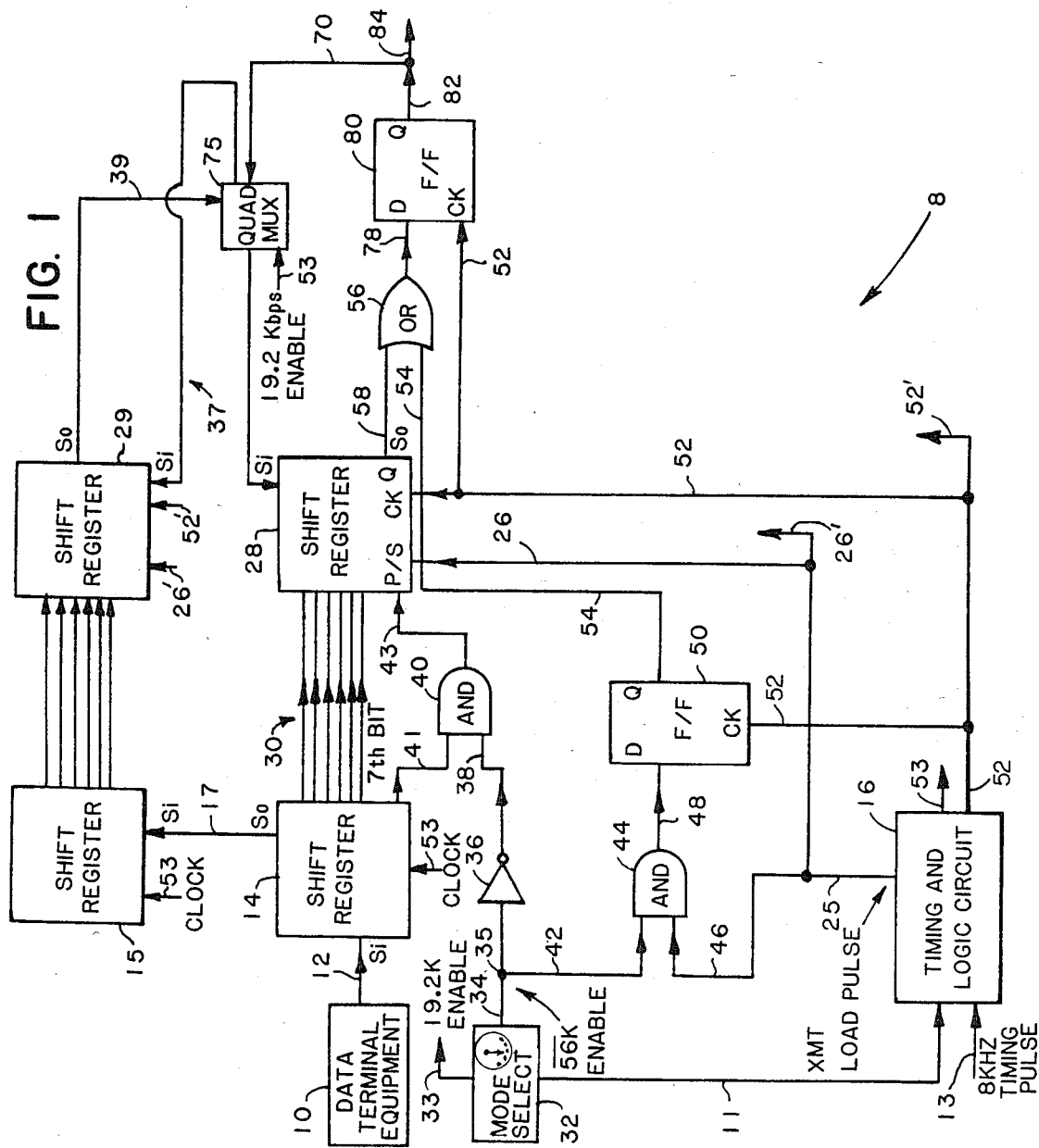
FIG. 1 is a block digram illustrating the elements of the subrate grouping equipment employed in the instant invention.

Referring now to FIG. 1, it may be seen that subrate grouping equipment 8 comprises data terminal 10, shift registers 14, 15, 28 and 29, and a multiplexer circuit 75. A timing and logic circuit 16 is responsive to 8 kHz timing pulses on line 13 for producing transmit load pulses on lines 25 and 26 which control the loading of shift register 28. The 8 kHz timing pulses have pulse widths of less than 1/56 kHz or less than 17.86 microseconds. A mode select circuit 32, although microprocessor controlled in a preferred embodiment of the invention, is represented here as including a mode select switch 51 for selecting which mode the equipment is to operate in, i.e., 2400, . . . 56,000 bps. The circuit 32 produces a signal on line 11 for indicating which mode the equipment is operating in. When the equipment operates at a 2.4–19.2 kbps rate, circuit 32 also outputs a binary 1 on line 34. Further, circuit 32 outputs a binary 1 on line 33 only when the equipment is to operate at the 19.2 kbps subrate. Additionally, circuit 32 outputs a binary or logic 0 on line 34 when it operates at the 56 kbps rate. The circuit 16 is responsive to the mode select signal on line 11 from circuit 32 for sensing whether the equipment is operating in a 2.4, 4.8, 9.6, 19.2 or 56 kbps mode. Circuit 16 counts the number of timing pulses on line 13 for determining when to output a transmit load pulse on line 25. In the 2400 bps mode, circuit 16 counts 20 timing pulses prior to outputting a load pulse on line 25. Circuit 16 counts 10 and 5 timing pulses prior to outputting a load pulse when operating in the 4800 and 9600 bps modes, respectively. In the 19.2 kbps mode, circuit 16 also counts 5 timing pulses prior to generating a load pulse on line 25. Circuit 16 also produces a 56 kbps clock signal on line 25 and one of a 2.4, 4.8, 9.6, 19.2 or 56 kbps clock signal on line 53 for driving registers 14 and 15, depending on which one of the modes the equipment is required by switch 51 to operate in.

The equipment 8 accepts serial-binary data from data terminal 10 via path 12, where the data is read into shift register 14. Shift register 14 is a serial in, parallel out register of a universal type. The line 41 is a 7th bit data output line for when the circuit 8 is operating in the 56 kbps data mode. The time at which data bytes are written out of register 14 and into register 28 is set by the transmit load pulses from timing circuit 16.

As is well known, the PCM work includes 8 bits, but only 7 bits are available for data transmission at the 56 kbps rate. Because of the necessity to provide byte identification, a control bit is needed and is located, as is described hereinafter, in the most significant bit position. Thus, 6 bits are available for each data byte. At the 2400 kbps rate it will require 2.5 milliseconds to serially read 6 data bits into shift register 14. Thus, every 2.5 milliseconds a timing or load pulse will appear on line 25 and through path 26 to the P/S input which enables register 28 to broadside load (in a parallel format 30) the 6 data bits present in shift register 14. The circuit 16 and register 28 operate in a similar manner for the other modes.

A 7th bit is then added, and it is normally a binary 0. Mode select 32 provides a binary 1 on path 34 for other than the 56 kbps mode inverted by amplifier 36 so as to provide a binary 0 on path 38 at the input to AND-gate 40, thus insuring that the output of gate 40 on path 43 is a binary 0, and this is applied to the most significant bit input of shift register 28. The 56 kHz timing pulses on path 52 are applied to the clock input of register 28, causing the binary digits stored in register 28 to be serially read out from its Q output onto path 58 to one input of OR-gate 56. This byte will be recirculated through register 28 for the 2.4–9.6 kbps data modes.

In order to identify the beginning of each unique byte serially written into shift register 14, an identifying-control or marker pulse signal is needed. A binary 1 is used for this purpose. The mode select output binary 1 pulse on path 34 for modes 2.4–19.2 kbps passes through junction 35 and path 42 to one input of AND-gate 44. The other input of gate 44 is the transmit load pulse from circuit 16. Thus, when the initiating transmit load pulse from circuit 16 appears on path 46, AND-gate 44 provides a binary 1 output on path 48 to the D-input of flip-flop 50. Clock timing for this flip-flop is the 56 kHz signal output from circuit 16. A binary 1 is written out of the Q output of flip-flop 50 via path 54 to the other input of OR-gate 56. Thus, at the beginning of the bytes first appearance on line 58 the expanded data byte will have a binary 1 in the most significant bit position. Following the first recirculation, bytes will then have a binary 0 as the bit in the most significant bit position as a result of a 0 on line 46 to AND-gate 44.

The multiplexer 75 is a two input-two output Quad multiplexer which is responsive to an input signal on line 39 only when it is enabled by a logic 1 on line 33 from mode select circuit 32. Otherwise it passes the expanded data byte, that is clocked through flip-flop 80, to the serial input of register 28 for recirculating it through this register 28, gate 56, flip-flop 80 and multiplexer 75 a prescribed number of times. This recirculation continues and the same sequence of bits are read through until a timing pulse on line 26 writes into register 28 a new byte of data from register 14. Of course the data passes through OR-gate 56 and flip-flop 80 to the data output path 84 at each appearance.

Figure 2:
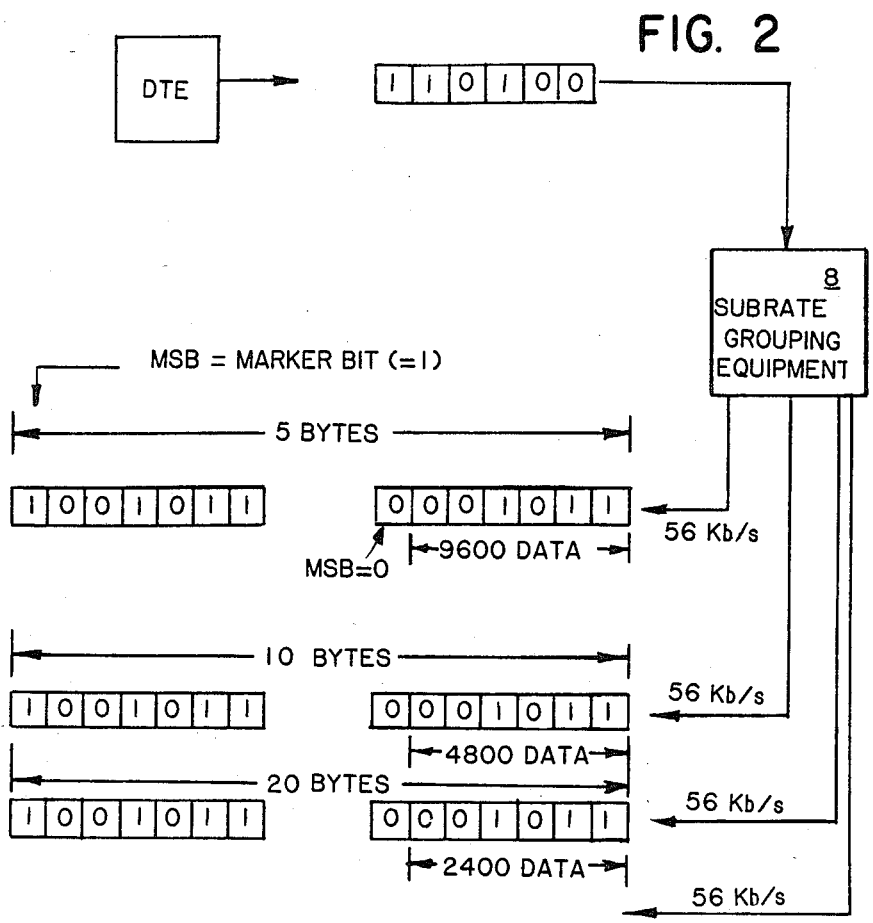
FIG. 2 is a diagram which symbollically indicates how a 6 bit data byte is expanded to a 7 bit byte and how the 7 bit byte is recirculated a predetermined number of times for the 2400, 4800 and 9600 bit data rates.

Referring now to FIG. 2, it may be seen that the expanded 7 bit data byte is recirculated 20 times for the 2400 bit rate; 10 times for the 4800 bit rate; and 5 times for the 9600 bit rate. In essence, 6 data bits are employed along with the control or marker bit in the most significant bit position. In accordance with one aspect of this invention, it was discovered that for the 19.2 kbps rate that two 6 bit bytes can be effectively used and read out as a 12 bit byte two and one-half times. The manner in which the circulation may be accomplished will be understood by referring again to FIG. 1 along with the following description.

Figure 3:
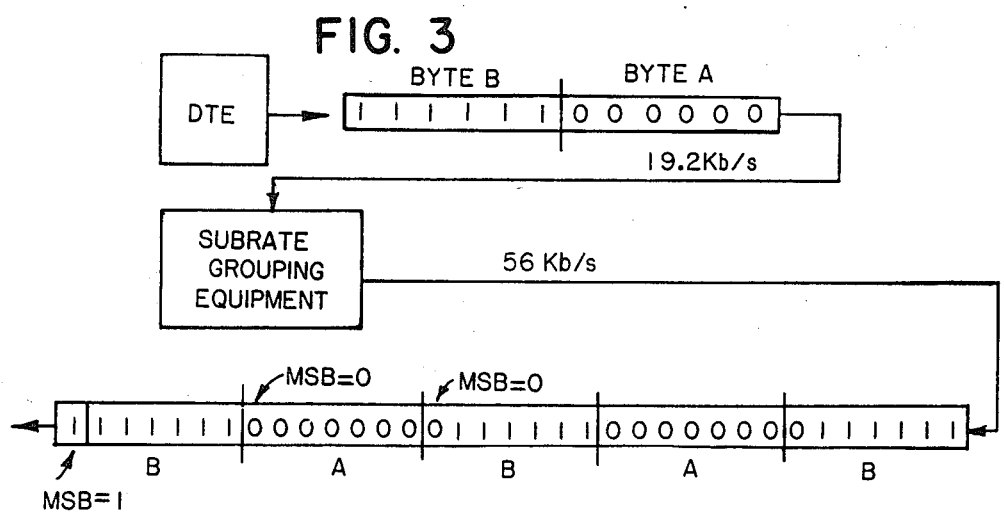
FIG. 3 illustrates how two sequential 6 bit bytes that are each expanded to 7 bits at 19.2 kbps rate are converted into a 56 kbps data signal.

For the 19.2 kbps mode, circuit 16 provides output pulses on line 25 separated by approximately 0.3 milliseconds, i.e., the time to read 6 bits into shift register 14 at the 19.2 kbps rate. In accordance with another aspect of this invention, it is desirable to obtain 12 data bits for circulation in two 6 bit bytes when operating in the 19.2 kbps mode. This is accomplished through the additional shift registers 15 and 29 Quad multiplexer 75 which is now enabled by a binary 1 on line 33 from mode select 32 to allow it to receive a signal on line 39. The input data signal on line 12 is clocked serially into shift register 14 and subsequently serially clocked out onto line 17 to shift register 15. When a load pulse now appears on lines 26 and 26', registers 28 and 29 both parallel load the contents of associated shift registers 14 and 15 (which now contain bytes B and A, respectively). A binary marker bit (and subsequently a binary 0) is impressed in only the MSB in register 28 with a first circulation of these two bytes in the same manner as was previously described. A binary 0 is impressed in the MSB position of a byte in register 28, for example by physically grounding the 7th bit position of that register. In operation, data is serially clocked out of register 28 and through OR-gate 56, clocked through flip-flop 80 and into multiplexer 75, into the serial input of register 29, out of the serial output of register 29, and through the multiplexer to the serial input of register 28 where it is serially clocked out on line 58 for recirculation. As shown in FIG. 3, the binary 1 control bit appears only in the most significant bit position of the expanded data byte B. These two data bytes B and A circulate until the next appearance of a load pulse on lines 26 and 26' from circuit 16.

What is claimed is:

1. In a data transmission system, apparatus for converting a serial subrate binary data stream into a binary signal at the line transmission rate, comprising:
   first means for periodically accepting a data byte from said subrate data stream with data in other than a first bit position;
   second means for expanding said data byte by one additional bit by adding a control bit in the first bit position of said accepting means;
   third means for recirculating said expanded data byte through said accepting means a predetermined number of times;
   fourth means for causing said one additional bit in the first bit position to be one of a binary 1 and 0 in the first expanded byte outputted from said first means and applied to said third means and to be the other of a binary 1 and 0 for recirculated bytes for the same expanded byte; and
   fifth means for serially reading out said bits of said expanded data byte at the line transmission rate.

2. Apparatus as set forth in claim 1 wherein said first means comprises:
   a first shift register adapted to accept said serial binary data and to write out said byte of data in a parallel format;
   timing means providing a periodic write pulse when a predetermined number n of bits defining the size of said data byte has been read into said first shift register; and
   a second shift register enabled by said write pulse to accept said data byte in parallel format from said first shift register, and to accept serial binary bits from said third means, said second shift register writing out expanded and recirculated data bytes in serial form.

3. Apparatus as set forth in claim 2 wherein said second means comprises:
   means for generating an enabling signal when the data stream includes subrate data;
   means to invert said enabling signal; and
   means responsive to said inverted enabling signal to provide a bit having a predetermined binary state in the first bit position of said expanded data byte written into said second shift register.

4. Apparatus according to claim 3 wherein said first bit position is the MSB of a byte.

5. Apparatus according to claim 2 wherein said second means comprises sixth means for causing the first bit position in said second shift register to be a binary 0 when the data stream includes subrate data.

6. Apparatus according to claim 5 wherein the first bit position is the MSB of the expanded data byte.

7. Apparatus according to claim 6 wherein said fourth means comprises the MSB to be a binary 1 in the first expanded data byte outputted therefrom and to be a binary 0 for recirculated-expanded data bytes outputted therefrom.

8. Apparatus according to claim 1 wherein said first bit position is the MSB of a byte.

9. Apparatus according to claim 8 wherein said fourth means causes the MSB to be a binary 1 in the first expanded data byte outputted therefrom and to be a binary 0 for recirculated-expanded data bytes outputted therefrom.

10. Apparatus according to claim 9 wherein the time interval for one of n and 2n bits of data at the subrate is divisible by the time interval for n+1 bits of data at the line rate an integral number of times which is equal to said predetermined number of times that said third means recycles said expanded data byte.

11. Apparatus according to claim 10 wherein said first means accepts a pair of data bytes from said subrate data stream, with data in other then a first bit position for each data byte, when the subrate is such that only a 2n subrate time interval is divisable by the n+1 line rate time interval an integral number of times; said second means also causing one data byte of said pair to always have a binary 0 in its MSB position; said third means serially recirculating the other and one data bytes of said pair.

12. Apparatus according to claim 11 wherein said first means comprises first and second shift registers initial holding said other and one data bytes and each clocked at the line rate; and wherein said third means comprises a Quad multiplexer having a pair of inputs and a pair of outputs and being enabled with the 2n subrate data is present in the data stream, and means for electrically connecting its (Quad multiplexers) first input to receive the output of said fifth means, its first output to a serial input of said second shift register, its second input to a serial output of said second shift register, and its second output to a serial input of said first shift register, said fifth means serially reading out bytes of expanded data from said first register at the line rate for recirculating said other and one expanded data bytes through said Quad multiplexer and second and first shift registers.

13. Apparatus according to claim 12 wherein the line rate is 56 kbps and the subrate is 19.2 kbps.

14. Apparatus according to claim 12 wherein said first means further comprises third and fourth shift registers, said third shift register serially receiving 2n subrate data and serially outputting it into said fourth shift register at the 2n subrate, said first and second shift registers being responsive to control pulses for periodically parallel loading the other and one data bytes that are in said third and fourth shift registers into other than MSB positions in said first and second shift registers, respectively, which are clocked at the line rate.

15. Apparatus according to claim 8 wherein said second means comprises sixth means for causing the MSB in the first byte position in said first means to be a binary 0 when the data stream includes subrate data; and wherein said fourth means comprises:

timing means periodically providing a control pulse each time a predetermined number n of bits defining the size of a non-expanded data byte is read into said first means and providing clock pulses at the line rate;

OR-gate means having a first input electrically connected to an output of said first means, having a second input terminal, and having an output; and sixth means responsive to clock pulses at the line rate for connecting the control pulse to the second input of said OR-gate means for causing only the MSB of the first outputted-expanded data byte from said first means to be a binary 1 and MSB's of subsequent recirculated-expanded data bytes to be a binary 0.

16. Apparatus according to claim 15 wherein said first means comprises:

a first shift register adapted to a accept serial binary data and to write out said byte of data in a parallel format; and a second shift register enabled by the control pulse for accepting said data byte in parallel format from said first register, and accepting serial binary bits from said third means, said second shift register writing out expanded and recirculated data bytes in serial form.

17. Apparatus according to claim 16 wherein said second means comprises:

seventh means for generating an enabling signal only when the data stream includes subrate data; and eighth means for causing said enabling signal to impress a binary 0 in the first bit or MSB position of said expanded data byte in said second shift.

18. Apparatus according to claim 17 wherein said fourth means further comprises;

AND-gate means having a first input terminal receiving the control pulse, which is a binary one when it is present, having a second input terminal and having an output terminal;

ninth means for inpressing a binary 1 on the the second input terminal of said AND-gate means when said seventh means produces an enabling signal; and tenth means having an input terminal connected to the output terminal of said AND-gate means and having an output terminal connected to the second input terminal of said OR-gate means, and clocked at the line rate.

* * * * *